June 24, 1941.  V. P. SHELTON  2,247,257
CUT FILM HOLDER
Filed March 29, 1941
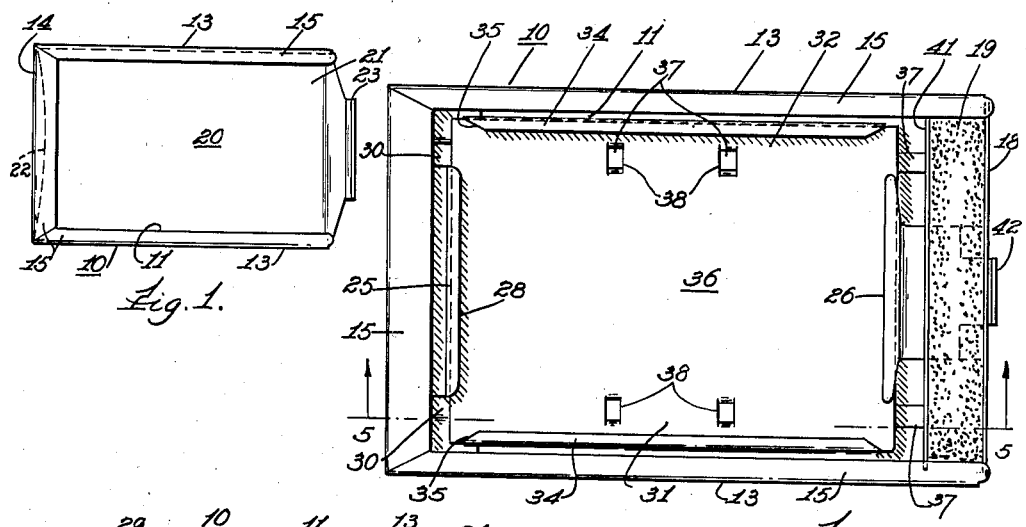
Fig. 1.
Fig. 2.
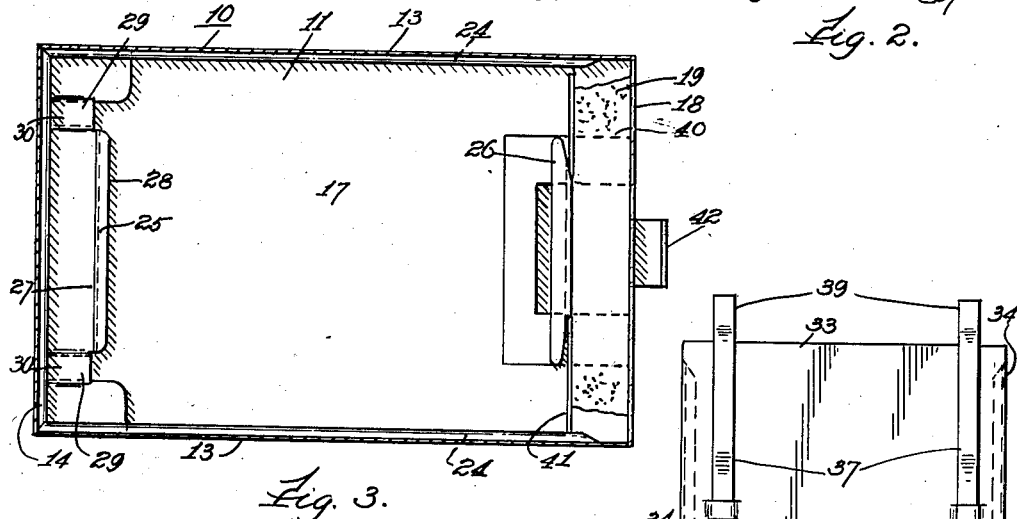
Fig. 3.
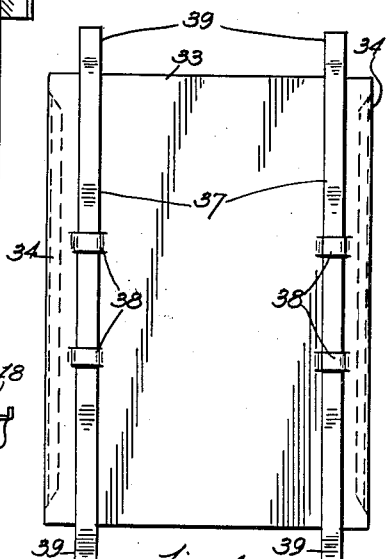
Fig. 4.
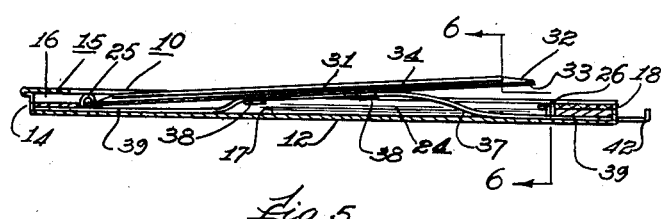
Fig. 5.
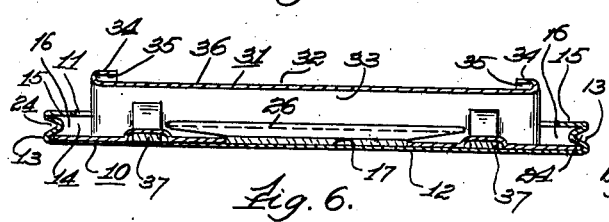
Fig. 6.
Inventor
Vernon P. Shelton
by James R. McKnight
his Attorney.

Patented June 24, 1941

2,247,257

UNITED STATES PATENT OFFICE 2,247,257

CUT FILM HOLDER

Vernon P. Shelton, Chicago, Ill.

Application March 29, 1941, Serial No. 385,897

2 Claims. (Cl. 95—66)

My invention relates to a cut film holder for cameras including those previously adapted to use sensitized glass plates or the like.

Among the objects of my invention is to provide a simplified cut film holder eliminating complicated constructions often bent or distorted in use. My cut film holder omits the use of unwieldy frame and hinge or sheath constructions which have often prevented successful loading. My cut film holder is so constructed as to afford maximum efficiency in the loading of the modern and highly sensitized emulsions in the dark or the light permitted therefor. The simplicity of my construction enables the user to load with unusual speed, thus preventing likelihood of light fog on the loaded film. Another object of my invention is to provide a holder in which sheets of sensitized material may be held flat in a focal plane, and such other objects, advantages and capabilities as will later more fully appear and which are inherently possessed by my invention.

While I have shown in the accompanying drawing a preferred form of my invention, yet I wish it understood that the same is susceptible of modification and change without departing from the spirit of my invention.

Referring to the drawing, Fig. 1 is a front view of my cut film holder in reduced scale in closed position; Fig. 2 is a front view with the light sealing slide removed; Fig. 3 is a front view of the casing with the flanges cut away; Fig. 4 is a rear view of the platform and springs; Fig. 5 is a detailed sectional view on line 5—5 of Fig. 2 with the latch in open position; Fig. 6 is an enlarged detailed sectional view on line 6—6 of Fig. 5.

The embodiment selected to illustrate my invention comprises a casing 10 having an open front portion 11 and a flat back portion 12. The side walls 13 and one end wall 14 are bent substantially at right angles to form flanges 15. Grooves 16 are formed between the flanges 15 and the bottom of inner face 17 of the casing 10. A lower wall 18 extends across the other end of the casing 10 and immediately adjacent thereto and extending across the face 17 of the casing 10 and attached thereto is a frame 41 within which is positioned a light sealing member 19 of mohair or the like attached thereto. A light sealing slide 20 having a flat body portion 21 with a slightly inwardly curved front 22 and a handle 23 is provided. In operation this slide 20 is adapted to slide with its side edges within spaced grooves 16 and against mohair member 10 so as to close open front portion 11 of casing 10 and seal the same to prevent the entrance of light therein.

The side walls 13 have on their outer portions suitable grooves 24 adapted for slidable attachment to a camera.

Adjacent opposite ends are a pair of spaced detents 25 and 26. Detent 25 is fixed to the face 17 of the casing 10 and detent 26 is slidably attached to the face 17 of the casing 10. Said detents are each formed with a vertical portion 27 integrally bent at right angles to form an inwardly extending lateral portion 28.

Spaced on either side of said fixed detent 25 are raised members 29 having recesses 30.

A film retaining platform 31 has an open front portion 32 and a flat back portion 33 with formed side portions 34 forming grooves 35 between said side portions and the face 36 of said platform 31. Spaced flat springs 37 are attached to said back portion 33 by clips 38. The flat springs are bowed to form thrust portions 39.

My platform 31 is removably attached to casing 10 by inserting the ends of the springs 37 in recesses 30 at one extremity and by inserting the other ends of springs 37 in grooves 40 formed under frame 41. One end of platform 31 is positioned under fixed detent 25. The other end of platform 31 is permitted to remain temporarily upwardly extended by the springs 37 so as to permit the facile insertion of the cut film in the grooves 35 and on top of face 36. The farthest end of the inserted cut film rests under lateral portion 28 of fixed detent 25. When the cut film has been so inserted movable detent 26 is moved to innermost position by manual operation of sliding catch 42 which is attached to movable detent 26. In this position the detents 25 and 26 definitely define the focal plane of the cut film held thereby. When the light sealing slide 20 is in place as heretofore described, my cut film holder is ready for attachment to a camera for use.

Having thus described my invention, I claim:

1. A cut film holder for cameras comprising a casing having side walls and one end wall with overhanging flanges, an open end and an open face portion, a frame attached to said face and extending across said open end, a compressible light sealing member positioned within said frame, a fixed detent attached to said face adjacent said end wall, a movable detent slidably attached to said face adjacent the open end, a flat platform adapted to hold cut film, a pair of flat springs attached to the bottom of said platform, said springs having ends and bowed thrust portions, members attached to said face adjacent said end wall having recesses therein, said frame having recesses in its bottom portion, the ends of said springs positioned within the recesses in said members and said frame, the bowed portions of said springs resiliently holding the platform above the face of the body member, the ends of said springs slidable within the recesses to permit flattening of the springs when pressure is applied to the platform, said fixed detent engaging one end of said platform, said movable detent in outermost position being free of contact with the other end of said platform so as to permit loading of cut film on said platform, said movable detent in innermost position engaging said end of said platform, said detents then defining the focal plane of the holder, and closure means for light tight engagement with said body member.

2. A cut film holder for cameras comprising a body member having a face, a stationary detent directly fixed to the face of said body member adjacent the inner end thereof, a movable detent slidably attached to the face of said body member adjacent its outer end, a platform having side flanges to hold cut film, means for resiliently supporting said platform above said body member, said movable detent in outermost position being free of contact with the outer end of said platform so as to permit loading of cut film on said platform, said stationary detent positioned to normally and directly engage the inner end of said platform and the inner end of loaded cut film inserted under said stationary detent, said movable detent in innermost position directly engaging the outer end of the loaded cut film and the outer end of said platform, said detents then defining the focal plane of the holder, and closure means for light tight engagement with said body member.

VERNON P. SHELTON.